Dec. 14, 1926.

G. H. FLETCHER

INDUCTION MOTOR

Filed June 29, 1922

1,610,506

WITNESSES:
R. S. Harrison
O. B. Buchanan

INVENTOR
George Herbert Fletcher
BY
Wesley G. Carr
ATTORNEY

Patented Dec. 14, 1926.

1,610,506

UNITED STATES PATENT OFFICE.

GEORGE HERBERT FLETCHER, OF ASHTON-ON-MERSEY, ENGLAND, ASSIGNOR TO WESTINGHOUSE ELECTRIC & MANUFACTURING COMPANY, A CORPORATION OF PENNSYLVANIA.

INDUCTION MOTOR.

Application filed June 29, 1922, Serial No. 571,742, and in Great Britain June 29, 1921.

This invention relates to electric motors of the induction type and has for its object to construct an improved motor with good starting characteristics which depend on eddy currents generated in the motor.

What are commonly called eddy current starters are well known in connection with slip ring induction motors these starters comprising solid iron cores which are wound with coils connected to the slip rings of the motor. The starting currents induced in the rotor windings are conducted through the slip rings to the coils of the starter and eddy currents are generated in the solid iron cores of the latter which eddy currents give rise to components of rotor currents which are nearly in phase with the main air gap flux, the effect being similar to that of a rotor resistance which varies with the frequency of the rotor current that is with the slip frequency.

According to the present invention the eddy currents are generated in the core of the rotor of the motor which, for this purpose, has its magnetic circuit partly laminated and partly solid and the rotor conductors are associated with both portions of the magnetic circuit.

Figure 1:
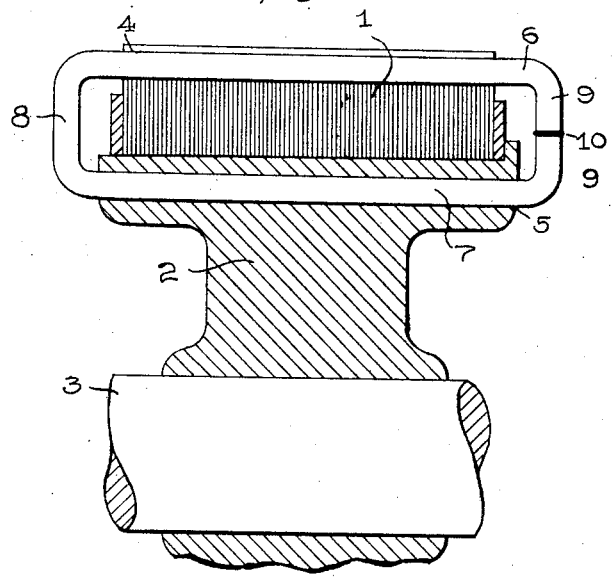
Figure 2:
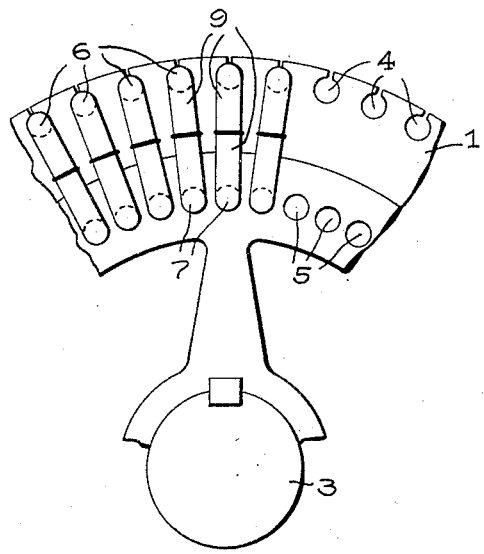

The invention will now be described with reference to the accompanying drawings in which Fig. 1 is a longitudinal sectional view of part of an induction motor rotor in accordance with the invention, and Fig. 2 is an end view thereof as seen from the right of Fig. 1.

The general formation of the rotor body itself is of the usual type and comprises an outer cylindrical ring 1 of laminated magnetic material such as steel stampings which are mounted in any convenient manner upon a spider 2 of solid iron or steel keyed to the motor shaft 3. The laminated ring 1 is provided near the periphery with a plurality of holes 4 constituting the conductor slots which may be of the partially open type, as shown. The solid spider or core 2 is provided with a plurality of holes 5 of similar size to the holes 4 and severally in radial alignment with the latter. The rotor conductors are formed of rods or bars of copper or other good conducting material of practically the same size as the holes 4 and 5 and of substantially U-, or hair-pin shape comprising an outer portion 6 lying in the laminated core 1, an inner portion 7 lying in the solid core of the spider 2, and a substantially radial end portion 8. As shown the free ends 9 of the portions 6 and 7 are bent radially towards one another and electrically connected together at 10 by welding or otherwise. The improved construction of rotor according to the invention thus comprises a plurality of conductors in a laminated iron core and each connected to a circuit passing through a solid core. The stator may be of any type of construction.

The operation is as follows:—At the moment of starting, that is when the rotor is stationary or moving at low speed, currents will be induced in the outer conductors 6 in the laminated iron core 1, the said currents having a frequency equal or nearly equal to that of the supply currents which flow in the stator windings. The currents induced in the outer portion 6 of the conductors will circulate through the portions 7, 8 and 9. The alternating currents of relatively high frequency flowing in the portion 7 embedded in the spider or solid portion of the rotor body 2 will generate eddy currents in the latter, such eddy currents being approximately 180° out of phase with the currents induced in the outer conductors 6. The conductor portions embedded in the solid iron body act thus like a low-resistance primary transformer-winding co-operating with a high resistance closed-circuited secondary transformer winding formed by the solid iron. The increased iron losses set up by the eddy currents result in a reduction of the starting current of the motor and at the same time bring it more nearly into phase with the main flux. A large starting torque is therefore obtained and this torque will be fairly uniform for all speeds. As the rotor speed increases during starting the frequency of the currents induced in the rotor is gradually reduced so that the eddy currents are correspondingly reduced and finally at normal running speed where the slip is small the frequency will be low and the eddy currents negligible.

It will be understood that the mechanical construction of the rotor core and windings may be different from that hereinabove described without departing from the nature of the invention.

I claim as my invention:

An electric induction motor having a rotor comprising an outer laminated iron ring on a solid spider of relatively conducting magnetic material and a plurality of conductors in the form of closed loops passing in an axial direction both through the laminated ring and the spider.

In testimony whereof, I have hereunto subscribed my name this 12th day of June, 1922.

GEORGE HERBERT FLETCHER.